(12) United States Patent
Cragun et al.

(10) Patent No.: US 8,819,565 B2
(45) Date of Patent: Aug. 26, 2014

(54) DESCRIBING ELEMENTS IN A VIRTUAL WORLD BASED ON CHANGES SINCE A PREVIOUS ENCOUNTER

(75) Inventors: Brian John Cragun, Rochester, MN (US); Zachary Adam Garbow, Palo Alto, CA (US); Christopher A. Peterson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1470 days.

(21) Appl. No.: 12/120,578

(22) Filed: May 14, 2008

(65) Prior Publication Data

US 2009/0287490 A1 Nov. 19, 2009

(51) Int. Cl.
*G06F 3/048* (2013.01)
(52) U.S. Cl.
USPC ............................................................ 715/757
(58) Field of Classification Search
USPC ........................................ 715/706, 745, 757
See application file for complete search history.

(56) References Cited

U.S. PATENT DOCUMENTS

| | | | | |
|---|---|---|---|---|
| 6,006,254 A * | 12/1999 | Waters et al. | ................ | 709/205 |
| 6,229,533 B1 * | 5/2001 | Farmer et al. | ................ | 345/473 |
| 6,329,986 B1 * | 12/2001 | Cheng | ........................... | 345/419 |
| 7,155,680 B2 * | 12/2006 | Akazawa et al. | ............. | 715/757 |
| 7,230,538 B2 * | 6/2007 | Lai et al. | ..................... | 340/573.1 |
| 8,010,474 B1 * | 8/2011 | Bill | ................................ | 706/46 |
| 8,274,404 B2 * | 9/2012 | Sennett et al. | ................ | 340/944 |
| 2002/0171647 A1 * | 11/2002 | Sterchi et al. | ................. | 345/473 |
| 2003/0174178 A1 * | 9/2003 | Hodges | ......................... | 345/848 |
| 2006/0098089 A1 * | 5/2006 | Sofer | ............................... | 348/62 |
| 2007/0112761 A1 * | 5/2007 | Xu et al. | ........................... | 707/5 |
| 2009/0158161 A1 * | 6/2009 | Gibbs et al. | ................... | 715/733 |
| 2011/0269540 A1 * | 11/2011 | Gillo et al. | ....................... | 463/31 |

* cited by examiner

*Primary Examiner* — Omar Abdul-Ali
*Assistant Examiner* — Phuong Nguyen
(74) *Attorney, Agent, or Firm* — Patterson & Sheridan, LLP (57) ABSTRACT

Embodiments of the invention may be used to enhance the presentation of a virtual environment for certain users, e.g., a visually impaired user. Because users may visit, and revisit, locations within the virtual environment, the state of elements in the virtual environment may change. Accordingly, audible descriptions of an object, person or environment, may be adjusted to prevent redundant or unnecessary descriptions. For example, when the user encounters a given element a second time, rather than describe each characteristic of the element, only changes to the characteristics of the element are described.

19 Claims, 5 Drawing Sheets

DESCRIBING ELEMENTS IN A VIRTUAL WORLD BASED ON CHANGES SINCE A PREVIOUS ENCOUNTER

BACKGROUND OF THE INVENTION

Embodiments of the invention relate to presenting users with a virtual world, and more specifically, to improving accessibility in virtual worlds for disabled users by using audio descriptions based on previous encounters with virtual world elements.

DESCRIPTION OF THE RELATED ART

A virtual world is a simulated environment in which users may inhabit and interact with one another via avatars. An avatar generally provides a graphical representation of an individual within the virtual world environment. Avatars are usually presented to other users using a graphical representation depicting a human-like character. Multiple users "enter" a virtual world by logging on to a central server(s) and interact with one another through the actions of their avatars. The actions of a given avatar are typically controlled by the individual using a mouse and keyboard. Virtual worlds provide an immersive environment with an appearance typically similar to that of the real world, with real world rules such as gravity, topography, locomotion, real-time actions, and communication. Communication may be in the form of text messages sent between avatars, but may also include real-time voice chats.

Virtual worlds may be persistent between times when a given user is logged on. A persistent world provides an immersive environment (e.g., a fantasy setting used as a setting for a role-playing game) that is generally always available, and virtual world events happen continually, regardless of the presence of a given avatar. Thus, unlike more conventional online games or multi-user environments, the events within a virtual world continue to occur for connected users even while are not actively logged on to the virtual world.

SUMMARY OF THE INVENTION

Embodiments of the present invention generally provide a method and apparatus for describing elements within a virtual world to a user of the virtual world. One embodiment of the invention includes a method of presenting a virtual environment to a user. The method may generally include identifying an element present in the virtual environment, determining a first state of the element within the virtual environment based on one or more characteristics associated with the element, generating a description of the element based on one or more differences between the first state and a previous state of the element within the virtual environment, and presenting the generated description of the element to the user.

Another embodiment of the invention includes a computer-readable storage medium containing a program that when executed, performs an operation of presenting a virtual environment to a user. The operation may generally include identifying an element present in the virtual environment, determining a first state of the element within the virtual environment based on one or more characteristics associated with the element, and generating a description of the element based on one or more differences between the first state and a previous state of the element within the virtual environment. The operation may further include presenting the generated description of the element to the user.

Another embodiment of the invention includes a system having a processor and a memory containing a containing a program that, when executed by the processor, performs an operation for presenting a virtual environment to a user. The operation may generally include identifying an element present in the virtual environment, determining a first state of the element within the virtual environment based on one or more characteristics associated with the element, and generating a description of the element based on one or more differences between the first state and a previous state of the element within the virtual environment. The operation may further include presenting the generated description of the element to the user.

Still another embodiment of the invention includes a method of presenting a virtual environment to a user. This method may generally include, during a first encounter with the virtual environment, identifying at least one element present in the virtual environment, generating a first description of the element, based on one or more characteristics associated with the element, and presenting the first generated description of the element to the user. This method may generally further include, during a second encounter with the virtual environment, generating a second description of the element, wherein the second description describes changes to the one or more characteristics described in the first description and presenting the second generated description of the element to the user.

BRIEF DESCRIPTION OF THE DRAWINGS

So that the manner in which the above recited features, advantages and elements of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention may be used to enhance the presentation of a virtual environment for certain users, e.g., a visually impaired user. Because users may visit, and revisit, locations within the virtual environment, the state of elements in the virtual environment may change. Accordingly, audible descriptions of an object, person or environment, may be adjusted to prevent redundant or unnecessary descriptions. The present invention generally provides a method and apparatus for describing elements in a virtual world based on changes since a previous encounter. In one embodiment, a user-controlled avatar encounters an element in a first state. The element is described to the user according to the characteristics of the element in the first state. The user encounters the element at a later time. The differences in the element between the first state and the second state are determined, and the differences may be described to the user in terms of the most significant differences.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as DVD-ROM disks readable by a DVD-ROM drive) on which information is permanently stored; (ii) writable storage media (e.g., DVD-RW disks within a DVD-RW drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, element, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1A:
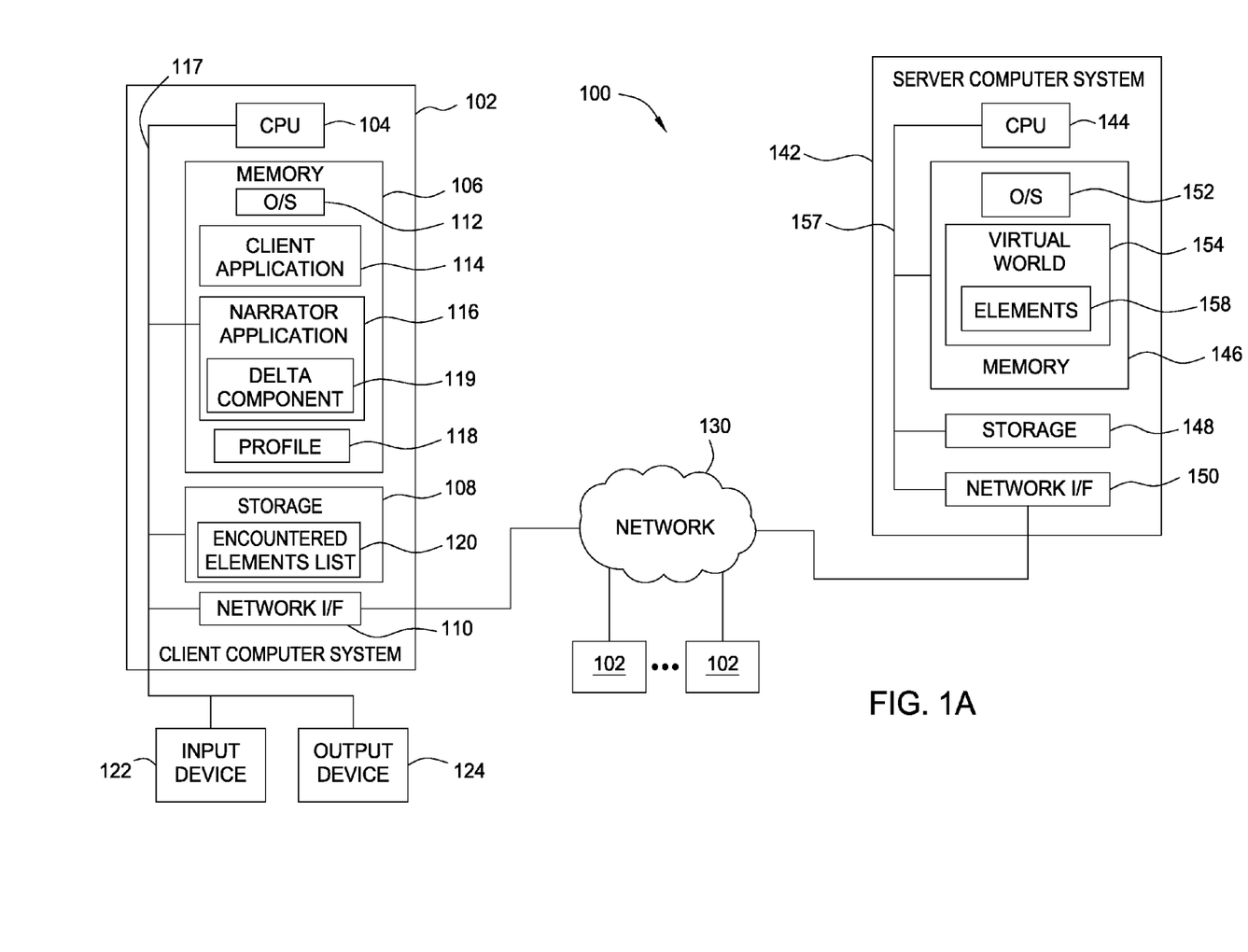
FIGS. 1A-1B is a block diagram illustrating a system configured to describe elements in a virtual world based on changes since a previous encounter, according to one embodiment of the invention.

FIG. 1A is a block diagram illustrating a system 100 configured to provide a virtual environment, according to one embodiment of the invention. System 100 allows elements present within a virtual environment to be described to a user based on changes that have occurred to the virutal environment since a previous encounter In general, the networked system 100 includes multiple client computers 102 and a virtual world server 142. As shown, the client computer 102 and virtual world server 142 are connected via a network 130. In general, the network 130 may be any data communications network (e.g., a TCP/IP network such as the Internet) configured to allow client computers 102, and the server system 142 to communicate with one another.

The client 102 includes a Central Processing Unit (CPU) 104 connected via a bus 117 to a memory 106, a storage 108, a network interface device 110, input device 122, and output device 124. The processor 104 could be any processor used to perform an embodiment of the invention. The client 102 is generally under the control of an operating system 112, which is shown in the memory 106. Examples of operating systems 112 include UNIX, versions of the Microsoft Windows® operating system, and distributions of the Linux® operating system. (Note: Linux is at trademark of Linus Torvalds in the United States and other countries.) More generally, any operating system 112 supporting the functions disclosed herein may be used.

Illustratively, main memory 106 also includes a client application 114, a narrator application 116, and a user profile 118. In one embodiment, client application 114 provides a software program that allows a user to connect to a virtual world 154, and once connected, to explore and interact with the virtual world 154 using an avatar to represent the presence of that user within the virtual environment. Client application 114 may also be configured to generate and display visual representations of the environment that includes elements 158 within the virtual world 154.

The narrator application 116 may be configured to generate sounds and or speech recordings to describe elements 158 of the virtual world 154. This may be useful, for example, in allowing a user with a visual impairment to experience the virtual environment through the playing of textual/recorded descriptions/sounds of the elements 158. Illustratively, while the client application 114 displays an element 158, such as a desk in a virtual office, the narrator application 116 may announce: "You have entered an office with an oak desk; the desk is to your left," for the benefit of the visually impaired user.

Additionally, while a given user interacts with the virtual environment, the system 100 may monitor the state of certain elements in order to inform the user of substantial changes that occur over time. For example, as shown, the narrator application 116 includes a delta component 119. In one embodiment, the delta component 119 may be configured to determine what (and whether) changes have occurred to elements of the virtual environment after an avatar's initial encounter with such elements. Further, the narrator application 116 may communicate with the delta component 119 to determine what has changed in the virtual environment, as well as help prevent the narrator application 116 from presenting a description of the virtual environment that is redundant or includes an unnecessary (or unwanted) degree of detail. For example, upon returning to the virtual office mentioned above, the delta component 119 may determine that the desk in the virtual office was already described to the user, but has been moved to a new position. In such a case, instead of repeating the above description, the narrator application 116 may simply announce: "you have returned to the office; the desk has moved from the left side of the room to the right side."

In one embodiment, the degree of detail regarding a scene in the virtual envelopment described by the narrator application may be set as a matter of user preference. As suggested, while a user interacts with the virtual world 154, presenting that user with a large number of descriptions may be overwhelming, as verbal descriptions of many items may be unnecessary to provide an adequate description of a given scene within a virtual environment. Accordingly, the user may specify criteria or preferences within the profile 118 to identify (and limit) the types of elements, characteristics of elements, avatars, and types of changes that the user desires to be described.

While the narrator application 116 and delta component 119 are illustrated as a stand-alone application, numerous embodiments are possible. For example, in an alternative embodiment, the narrator application 116 and delta component 119 may be implemented as a web browser and various plug-in applications. In another alternative, the narrator application 116 and/or delta component 119 may be integrated components of the virtual world 154. Thus, embodiments of the narrator application 116 and delta component 119 are not intended to describe a particular hardware and/or software architecture.

Storage 108 represents any combination of fixed and/or removable storage devices, such as fixed disc drives, floppy disc drives, tape drives, removable memory cards, flash memory storage, or optical storage. Illustratively, the storage 108 includes an elements list 120. The elements list 120 may store a record of each element that the user's avatar encounters while exploring virtual environment provided by virtual world 154. In one embodiment, the delta component 119 may reference entries in the elements list 120 to identify previously encountered elements, and the changes to the element 158 since the avatar's last encounter.

The network interface device 110 may allow network communications between the client 102, the administrator 132, and the virtual world server 162 via the network 130. The input device(s) 122 can be any device to give input to the client 102. For example, a keyboard, keypad, light pen, touch-screen, track-ball, microphone, speech recognition unit, and the like could be used.

The output device 124 can be any device configured to present the virtual world 154 and accompanying elements 158 to the user, e.g., a CRT or LCD monitor along with a set of audio speakers. Although shown separately from the input device 122, the output device 124 and input device 122 could be combined. For example, a display screen with an integrated touch-screen, integrated keyboard, or a speech recognition unit combined with a text-to-speech converter could be used.

Further, in one embodiment, the user may interact with client application 114 and virtual world 154 using a variety of virtual reality interaction devices. For example, the user may don a set of virtual reality goggles that have a screen display for each lens. Further, the goggles could be equipped with motion sensors that cause the view of the virtual world 154 presented to the user to move based on the head movements of the individual. As another example, the user could don a pair of gloves configured to translate motion and movement of the user's hands into avatar movements within the virtual world 154 environment. Of course, embodiments of the invention are not limited to these examples and one of ordinary skill in the art will readily recognize that the invention may be adapted for use with a variety of devices configured to present the virtual world 154 to the user and to translate movement/motion or other actions of the user into actions performed by the avatar representing that user within the virtual world 154.

As stated, embodiments of the invention may assist users with vision impairments in exploring and experiencing the virtual environment provided by the virtual world 154. For example, textual descriptions of elements 158 displayed in a large font may help users with limited vision to participate in the virtual world experience. Similarly, recorded statements describing elements 158 in the virtual world, or even sound effects appropriate for elements in the virtual world, may be presented to the visually-impaired user. Further, while sighted users may view the virtual world 154 using display devices such as a plasma, an LCD, or a CRT monitor, the virtual world 154 may be described verbally using, e.g., speakers or headphones for users that are blind or with impaired vision. Similarly, for users with impaired hearing, textual descriptions of certain auditory events may enhance the accessibility of the virtual world for such individuals.

The virtual world server 142 may be similarly constructed to client 102. Thus, as shown, the virtual world server 142 includes a CPU 144, a memory 146, a storage device 148, and a network interface device 150, coupled to one another by a bus 157. The memory 146 may be a random access memory sufficiently large to hold the necessary programming and data structures that are located on the virtual world server 142. The programming and data structures may be accessed and executed by the CPU 144 as needed to allow users to connect to, and interact with both one another and elements 158 of the virtual environment provided by the virtual world 154.

As shown, the memory 146 includes the virtual world 154, and an operating system 152. Storage 148 represents any combination of fixed and/or removable storage devices, such as fixed disc drives, floppy disc drives, tape drives, removable memory cards, flash memory or optical storage, etc, as well as network or virtualized storage devices.

Figure 1B:
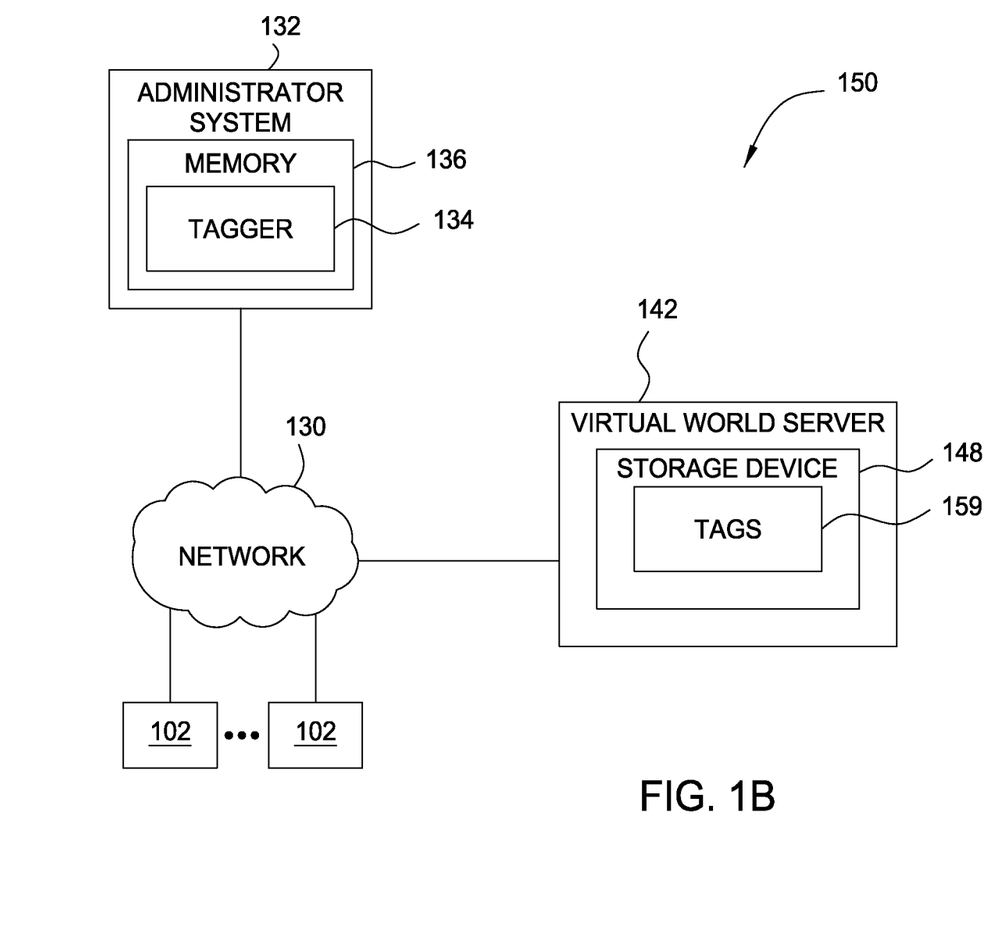

FIG. 1B is a block diagram further illustrating components of a system 150 configured to describe elements in a virtual world based on changes since a previous encounter, according to one embodiment of the invention. In general, the networked system 150 includes an administrator computer 132 and multiple client computers 102, each configured to connect to a virtual world server 142 and allow a user to interact with a virtual environment provided by the virtual world server 142 using a client application 114.

Illustratively, the virtual world server 142 includes a storage device 148 that stores a collection of tags 159, described below in the context of a tagger application 134 executing on the administrator computer. The administrator computer 132 is similarly constructed to the client computer 102 having a processor, memory, storage device and network interface (not shown). Illustratively, administrator computer 132 may include a tagger application 134 in a memory 136.

In one embodiment, an administrative user may create and/or maintain the audio/textual descriptions presented to a given user by the narrator application 116. The tagger application 134 may provide a software application configured to record and store textual and audio descriptions, referred to herein as tags 159, for the elements 158 in the virtual world 154. In turn, the narrator application 116 may present the tags 159 to certain users interacting with client computer 102 via audio description, e.g., by presenting the audio recording, or generating text-to-speech audio, e.g., for a visually impaired user.

In one embodiment, certain users of the virtual world 154 may explore the virtual world 154 and create tags 159 for the elements 158. In one embodiment, the user interface of client applications 114 may allow users (or administrators) to click on a graphical representation of an element 158 within the virtual world 154 and type in a textual description, i.e. a tag 159, of the element 158. In turn, when a visually impaired user encounters the element 158, the narrator application 116 may generate text-to-speech audio, effectively reading the textual description aloud to such a user.

Alternatively, the user may record an audio description of the element 158 for later playback by the narrator application 116. Further, in addition to the spoken word, users may record (or provide recordings of) sound effects to represent elements of 158 of the virtual world. Further, the narrator application 116 may present textual descriptions to a user with impaired vision by displaying text in a large font-size.

In one embodiment, the delta component 119, described above, may determine what changes to elements 158 present in a given location have occurred since a last encounter by comparing differences in tags 159 associated with the element 158. Specifically, in a scenario where new tags 159 have been associated with an element 159 since the avatar's last encounter with the element 158, the delta component 119 may identify the new tags 159 as changes since the last encounter. Alternately, where an administrative user has changed a description within an existing tag 159, the delta component may identify the changed descriptions within existing tags 159 as changes since the last encounter. In turn, the narrator application 116 may announce some subset (or all) of the descriptions contained in the tags 159 identified by the delta component 119.

Similarly, as described, the elements list 120 stored on the client 102 may identify which elements, and the state of such elements, that a given user has previously encountered while interacting with a virtual environment provided by a virtual world 154. Thus, elements list 120 may also be used to determine what changes to elements 158 present in a given location have occurred since a last encounter by comparing differences in tags 159 associated with the element 158.

FIG. 1 is merely one hardware/software configuration for the networked client computer 102, administrator computer 132, and virtual world server 142. Embodiments of the present invention may be adapted for use with a broad variety of computer hardware and software, regardless of whether the computer systems are complicated, multi-user computing apparatus, single-user workstations or network appliances that do not have non-volatile storage.

Figure 2A:
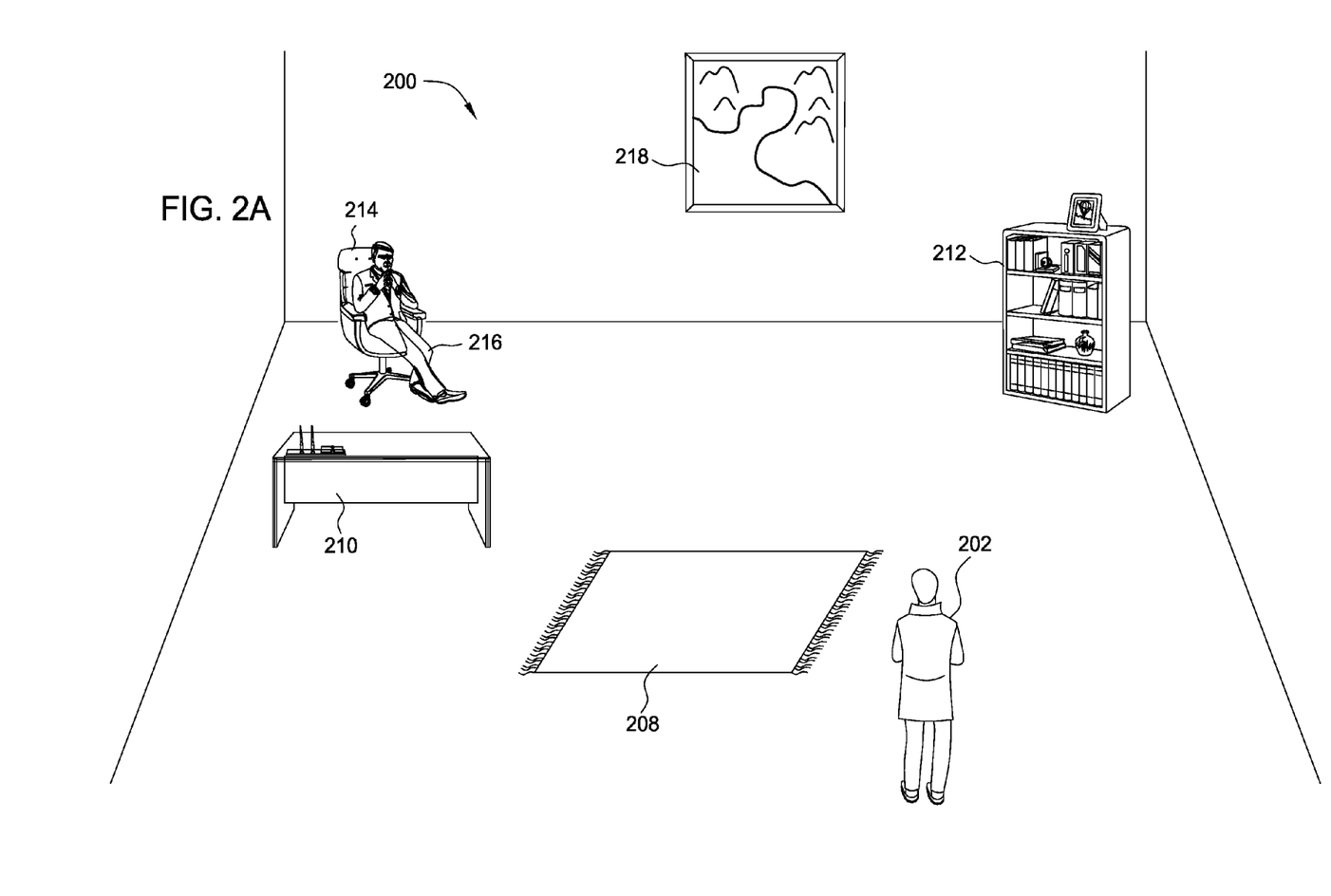
FIG. 2A is an example screen shot of a virtual office in a first state, according to one embodiment of the invention.
Figure 2B:
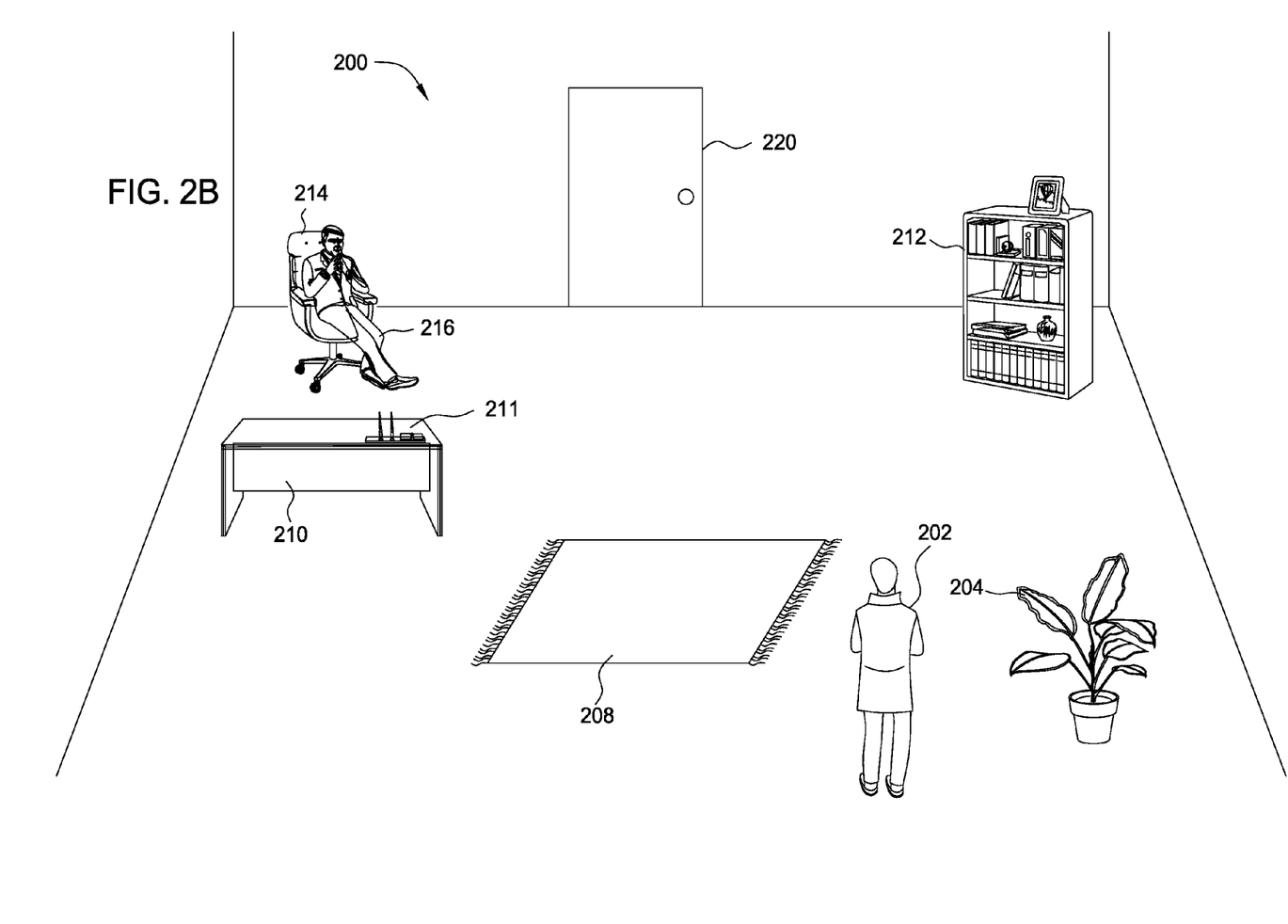
FIG. 2B is an example screen shot of the virtual office in a second state, according to one embodiment of the invention.

FIGS. 2A and 2B illustrate an example of a virtual office at different points in time. The sequence provides an example scenario where embodiments of the invention may be used to describe the environment based on changes between encounters with the virtual office. First, FIG. 2A provides an example screen shot of a virtual office 200 in a first state, according to one embodiment of the invention. As shown, the virtual office 200 includes an avatar 202, a decorative rug 208, a desk 210, a pen and pencil set 211, a bookcase 212, a chair 214, another avatar 216, and a painting 218. As used herein, references to the state of any of these elements signify a condition, in terms of characteristics of the element. The characteristics of elements may include, among other things, presence, position, rates of movement and acceleration, size, color, shape, clothing, and peripheral elements or sub-elements, e.g. a book in a bookcase.

When the avatar 202 enters the virtual office 200, the narrator application 116 may identify the elements present within the virtual office 200 and generate a description like the following: "You are in an office. There is a man wearing a suit, sitting behind an oak desk to your left. There is a blue rug on the floor before you. On the opposite wall, there is a painting of a mountain scene. To the right of the painting, there is a metal bookcase full of books." In one embodiment, the narrator application 116 records which elements 158 were described as part of avatar's 202 initial encounter with the virtual office 200. Additionally, narrator application 116 may store the descriptions of the elements 158 presented to the user, an indication of what degree of detail was used to describe the elements encountered in the virtual office 200, and associate the stored descriptions with a timestamp representing the time that the avatar 202 entered the virtual office 200. As described above, the descriptions may be stored in the elements list 120.

In one embodiment, the degree of detail captured in the encountered elements list 120 depends on the user profile 118. More specifically, the user may set limits on the amount of detail captured based on user-preference, system performance limits, and/or storage requirements of the client computer 102.

FIG. 2B provides an example screen shot of the virtual office 200 in a second state, according to one embodiment of the invention. As shown, the second state of the office may be the condition of the office at a time later than that described in FIG. 2A. Illustratively, the virtual office 200 includes the avatar 202, decorative rug 208, desk 210, a pen and pencil set 211, bookcase 212, chair 214, avatar 216, and a doorway 220. Upon the user's return to the office 200, the delta component 119 may determine the current state of the virtual office 200, i.e., the second state. Further, the delta component 119 may retrieve the information stored in the elements encountered list 120 to determine the differences between the first and second state of the virtual office 200.

In one embodiment, the delta component 119 may determine differences in element characteristics. Examples of element characteristics includes, presence, position, rates of movement and acceleration, size, color, shape, clothing, and peripheral elements or sub-elements. For example, in the virtual office 200 doorway 220 is present where there used to be a painting 218. A decorative plant 204 is located on the floor, where previously there was none. Lastly, the pen and pencil set 211 is on the right side of the desk 210 in FIG. 2B, while it is on the left side of the desk 210 in FIG. 2A.

Accordingly, in one embodiment, instead of repeating the description above supplemented with descriptions of the differences, the narrator application 116 may describe the office 200 as follows. "You are back in the office. There is now a doorway on the opposite wall where the painting was previously hanging. There is a potted plant on the floor to your right. The pen and pencil set is now on the right side of the desk." Advantageously, by only describing the differences between a first and second state of an element 158, the narrator application 116 spares the user redundant description. Understanding what has changed is often key to understanding what is important in a virtual world.

In one embodiment, if the avatar 202 is encountering an element 158 for the first time, the narrator application 116 may provide a higher level of description than that provided for previously encountered elements. In other words, because the door 220 and plant 204 are new to the avatar 202, the narrator application may provide additional detail than that described above. For example, the narrator application 116 may also say, in addition to the description provided above, "The door is painted red, and appears to be closed. The plant is a rubber tree plant." Similarly, because the bookshelf 212 has not changed, the narrator application 116 may provide only a limited description of this element or no description at all.

Similarly, if a significant amount of time has passed since the avatar's previous encounter with an element, the narrator application 116 may provide a higher level of detail than described above. The actual amount of time may be specified as a user preference in the profile 118. In some embodiments, the narrator application 116 may only describe differences between successive element states determined by the narrator application to be significant. The delta component 119 may identify a difference as significant based on the magnitude of a change, in terms of a change in appearance, or position. Other factors may be considered in determining significance, such as the frequency with which the avatar 202 encounters the element, or how much time has passed since a previous encounter.

For example, the appearance of a door 220 in the office 200 may represent a change of large magnitude considering the size of the office 200, the size of the door 220, or the fact that doors are not typically mobile. Similarly, a change in the size of the plant 204 may represent a change of magnitude (large or small) that may be considered in determining which changes are significant. Further, the frequency with which an avatar 202 encounters an element 158 may be considered in determining significance. For example, if the avatar 202 enters the office every day, and every day the pen and pencil set 211 is located on the left side of the desk, then a change in position of the pen and pencil set 211 may be more significant than if the avatar 202 is an infrequent visitor. Similarly, if the pen and pencil set 211 change positions every day, then the delta component 119 may require a change in position of large magnitude to identify the change as significant. Of course, one of skill in the art will readily recognize that a broad variety of techniques may be used to determine what changes to identify as significant and that a broad variety of characteristics may be used to measure differences between encounters.

Figure 3:
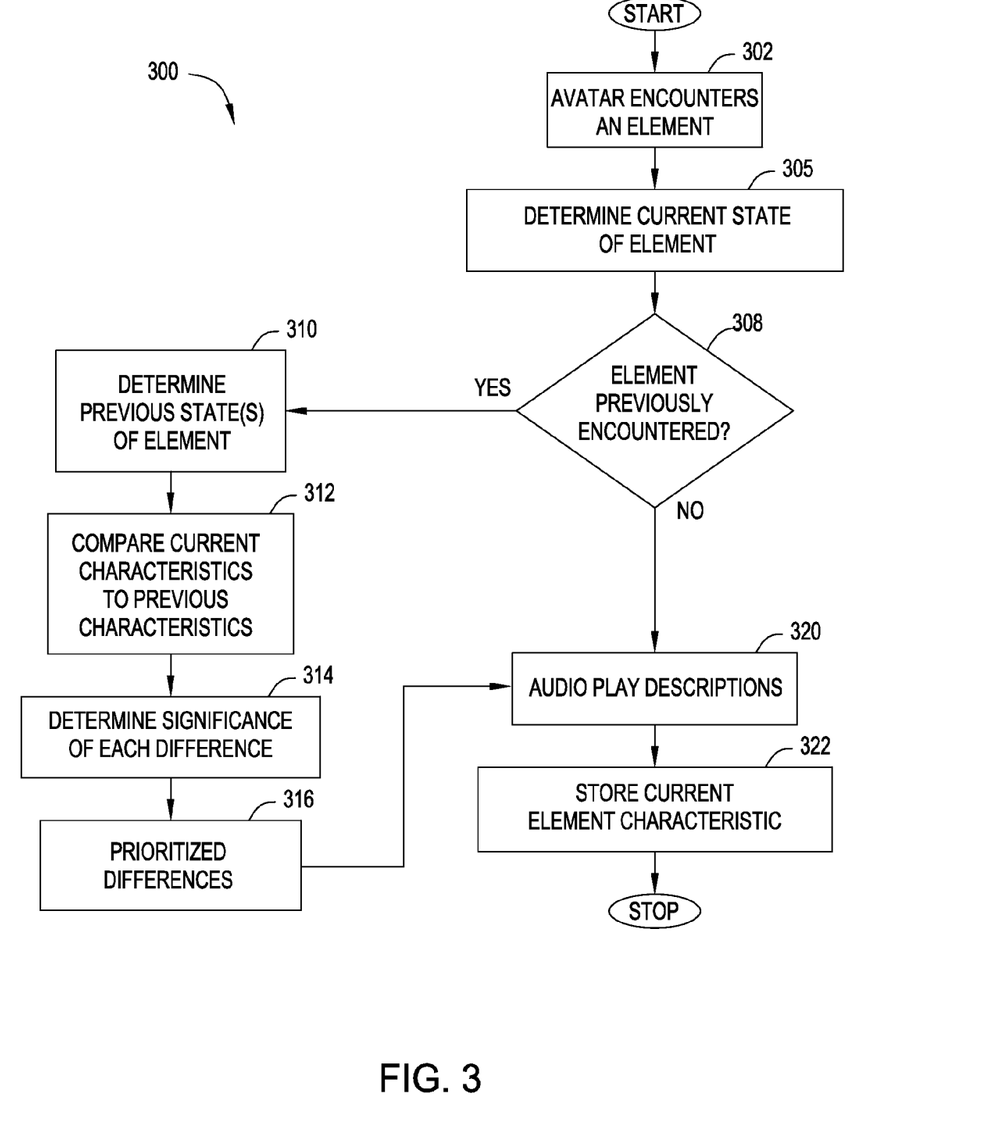
FIG. 3 is a flowchart illustrating a process for describing elements in a virtual world based on changes since a previous encounter, according to one embodiment of the invention.

FIG. 3 is a flowchart illustrating a process 300 for describing elements in a virtual world based on changes since a previous encounter, according to one embodiment of the invention. As shown, process 300 begins at step 302, when an avatar encounters an element. In one embodiment, process 300 may be invoked when a user enters a given location within the virtual environment, e.g., the virtual office 200. Further, process 300 may be invoked to evaluate multiple objects present within the given location, e.g., each of the objects present in the virtual office 200. Based on the evaluation, the audio description provided for any given element may be adjusted as necessary to allow the audio descriptions to remain relevant and valuable, and prevent redundancy.

At step 304, the delta component 119 may determine a current state of the element. For example, the delta component may determine the current state by querying the virtual world 154 for a set of current characteristics for the element. As stated, the characteristics of an element may include presence, position, rates of movement and acceleration, size, color, shape, clothing, and/or presence of peripheral or sub-elements, among other things.

At step 306, the delta component 119 may determine whether the avatar has previously encountered the element. If not, at step 320, the narrator application 116 may play back audio descriptions of the element including the characteristics of the element determined at step 304. Otherwise, where the avatar 202 has previously encountered the element, at step 310, the delta component 119 may determine a previous state of the element and/or a previous degree of description presented to the user regarding this element. In one embodiment, the characteristics of an element are stored in the elements list 120 for each encounter with that element. Thus, in a scenario where the avatar has multiple encounters with the same element, all (or some subset of) previous state data may be retrieved from the encountered elements list 120.

At step 312, the delta component 119 compares the characteristics of the current state to the characteristics of the previous state(s) to determine the differences between the states of the element 158. At step 314, the delta component 119 determines the significance of each difference in the distinct states. As described above in conjunction with FIG. 2B, significance may be determined based on magnitude of change, time passed since a previous encounter, and the frequency of encounters with an element 158, among other things.

At step 316, the delta component 119 may prioritize the differences between the states based on the significance, determined at step 314. Once prioritized, the delta component 119 may select a subset of differences for playback to the user based on the priorities. At step 320, the narrator application 116 plays the description to the user. At step 322, the characteristics related to the current state of the element along with a current timestamp are stored in the element list 120.

As described, the process 300 evaluates and presents a description of a single element that account for previous descriptions of that element presented to the user, and adjusted to account for any changes that have occurred since a previous encounter. Alternatively, groups of elements may be evaluated together and prioritized in a similar manner. For example, FIG. 2B illustrates a virtual office where an avatar has returned to that office after a previous encounter. In this scenario, rather than evaluate each object one by one, the narrator component 119 may identify the complete collection of objects and prioritize which ones to describe based on a an overall assessed importance of the object (i.e., some objects, even when unchanged, may have a high priority for description) as well as an assessed relative priority (i.e., a priority of one object relative to others in the scene) and an assessed priority based on changes that have occurred (i.e., objects with a low overall priority may nevertheless be described when changed significantly from prior encounters).

Advantageously, embodiments of the invention may be used to enhance the presentation of a virtual environment for certain users, e.g., a visually impaired user. Because a user may visit, and revisit, locations within the virtual environment, audible descriptions of an object, person or environment, may be adjusted to prevent redundant or unnecessary descriptions. In one embodiment, an appropriate description is generated by evaluating changes in the virtual environment and how long it has been since a user's previous encounter with elements of that environment. Thus, embodiments of the invention provide an enhancement to virtual worlds, and works in conjunction with general audio descriptions of objects to provide improved usability for visually impaired users. The amount of audio descriptions provided for any given element may be adjusted as necessary based on how often that object was encountered, when it was last encountered, and what has significantly changed since the previous (or average) encounter. This allows the audio descriptions to remain relevant and valuable, and prevent redundancy.

While the foregoing is directed to embodiments of the present invention, other and further embodiments of the invention may be devised without departing from the basic scope thereof, and the scope thereof is determined by the claims that follow.

What is claimed is:

1. A computer-implemented method of presenting a virtual environment to a user, the method comprising:

upon detecting a first arrival of the user at a first virtual location in the virtual environment:
  determining a then-current state of a first element based on one or more characteristics associated with the first element; and
  generating an audio description of a plurality of elements identified as being present at the first virtual location, including a first element and a second element;
detecting, subsequent to the first arrival, a second arrival of the user at the first virtual location;
detecting one or more visually perceptible differences between a now-current state and the then-current state of the first element within the virtual environment;
programmatically determining that a subset of the one or more visually perceptible differences of the first element are significant relative to one or more visually perceptible differences in the first element that are not in the subset; and
generating an audio description of the significant subset of the one or more visually perceptible differences of the first element based at least in part on an amount of time elapsed between the first arrival and the second arrival, wherein an audio description of the second element is not generated because no visually perceptible differences of the second element exist between the first arrival and the second arrival.

2. The method of claim 1, further comprising:
storing a record reflecting the then-current state of the element; and
associating the record with the element and a timestamp indicating a time of the first arrival.

3. The method of claim 2, wherein the one or more visually perceptible differences are detected by a virtual world application, wherein the virtual world application is configured to individually detect each change to the plurality of elements in the virtual environment selected from a presence of the element, a position of the element, a rate of movement of the element, a size of the element, a color of the element, a shape of the element, a state of the element, and a presence of peripheral or sub-elements of the element, wherein generating the audio description of the significant subset of the visually perceptible differences further comprises at least one of: (i) identifying the stored record as a new record, and (ii) identifying a change in a description of the element in a first record related to the element relative to a second record related to the element.

4. The method of claim 3, wherein the audio description does not describe the one or more visually perceptible differences not in the subset.

5. The method of claim 4, wherein the method further comprises prioritizing one or more of the plurality of elements, wherein the significance of a visually perceptible difference is determined based on: (i) a magnitude of a change in appearance and a change in position of the change, (ii) a frequency with which the avatar encounters the element; (iii) an amount of time elapsed since a previous encounter, and (iv) the priority of the one or more of the plurality of elements for which a visually perceptible difference is detected.

6. A computer-readable storage medium containing a program that when executed, performs an operation of presenting a virtual environment to a user, the operation comprising:
upon detecting a first arrival of the user at a first virtual location in the virtual environment:
  determining a then-current state of a first element based on one or more characteristics associated with the first element; and
  generating an audio description of a plurality of elements identified as being present at the first virtual location, including a first element and a second element;
detecting, subsequent to the first arrival, a second arrival of the user at the first virtual location;
detecting one or more visually perceptible differences between a now-current state and the then-current state of the first element within the virtual environment;
programmatically determining that a subset of the one or more visually perceptible differences of the first element are significant relative to one or more visually perceptible differences in the first element that are not in the subset; and
generating an audio description of the significant subset of the one or more visually perceptible differences of the first element based at least in part on an amount of time elapsed between the first arrival and the second arrival, wherein an audio description of the second element is not generated because no visually perceptible differences of the second element exist between the first arrival and the second arrival.

7. The computer-readable storage medium of claim 6, wherein the operation further comprises:
storing a record reflecting the then-current state of the element; and
associating the record with the element and a timestamp indicating a time of the first arrival.

8. The computer-readable storage medium of claim 7, wherein the one or more visually perceptible differences are detected by a virtual world application, wherein the virtual world application is configured to individually detect each change to the plurality of elements in the virtual environment selected from a presence of the element, a position of the element, a rate of movement of the element, a size of the element, a color of the element, a shape of the element, a state of the element, and a presence of peripheral or sub-elements of the element, wherein generating the audio description of the significant subset of the visually perceptible differences further comprises at least one of: (i) identifying the stored record as a new record, and (ii) identifying a change in a description of the element in a first record related to the element relative to a second record related to the element.

9. The computer-readable storage medium of claim 8, wherein the audio description does not describe the one or more visually perceptible differences not in the subset.

10. The computer-readable storage medium of claim 9, wherein the operation further comprises prioritizing one or more of the plurality of elements, wherein the significance of a visually perceptible difference is determined based on: (i) a magnitude of a change in appearance and a change in position of the change, (ii) a frequency with which the avatar encounters the element; (iii) an amount of time elapsed since a previous encounter, and (iv) the priority of the one or more of the plurality of elements for which a visually perceptible difference is detected.

11. A system, comprising:
a processor; and
a memory containing a containing a program that, when executed by the processor, performs an operation for presenting a virtual environment to a user, the operation comprising:
upon detecting a first arrival of the user at a first virtual location in the virtual environment:
  determining a then-current state of a first element based on one or more characteristics associated with the first element; and generating an audio description of a plurality of elements identified as being present at the first virtual location, including a first element and a second element;

detecting, subsequent to the first arrival, a second arrival of the user at the first virtual location;

detecting one or more visually perceptible differences between a now-current state and the then-current state of the first element within the virtual environment;

programmatically determining that a subset of the one or more visually perceptible differences of the first element are significant relative to one or more visually perceptible differences in the first element that are not in the subset; and generating an audio description of the significant subset of the one or more visually perceptible differences of the first element based at least in part on an amount of time elapsed between the first arrival and the second arrival, wherein an audio description of the second element is not generated because no visually perceptible differences of the second element exist between the first arrival and the second arrival.

12. The system of claim 11, wherein the operation further comprises:

storing a record reflecting the then-current state of the element; and associating the record with the element and a timestamp indicating a time of the first arrival.

13. The system of claim 12, wherein the one or more visually perceptible differences are detected by a virtual world application, wherein the virtual world application is configured to individually detect each change to the plurality of elements in the virtual environment selected from a presence of the element, a position of the element, a rate of movement of the element, a size of the element, a color of the element, a shape of the element, a state of the element, and a presence of peripheral or sub-elements of the element, wherein generating the audio description of the significant subset of the visually perceptible differences further comprises at least one of: (i) identifying the stored record as a new record, and (ii) identifying a change in a description of the element in a first record related to the element relative to a second record related to the element.

14. The system of claim 13, wherein the generated audio descriptions are output to the user, wherein the audio description does not describe the one or more visually perceptible differences not in the subset.

15. The system of claim 14, wherein the operation further comprises prioritizing one or more of the plurality of elements, wherein the significance of a visually perceptible difference is determined based on: (i) a magnitude of a change in appearance and a change in position of the change, (ii) a frequency with which the avatar encounters the element; (iii) an amount of time elapsed since a previous encounter, and (iv) the priority of the one or more of the plurality of elements for which a visually perceptible difference is detected.

16. A computer-implemented method of presenting a virtual environment to a user, comprising:

monitoring a set of actions by an avatar, under the control of the user, in the virtual environment;

during a first encounter, by the avatar user, with an element in the virtual environment:

interacting, by the avatar, with the element;

generating a first audio description of the element, based on one or more visually perceptible characteristics associated with the element, and presenting the first generated audio description of the element to the user; and during a second encounter, subsequent to the first encounter, by the avatar, with the element in the virtual environment:

detecting visually perceptible changes to the one or more characteristics described in the first description;

programmatically determining that the detected visually perceptible changes are significant;

generating a second description of the element based at least in part on an amount of time elapsed between the first encounter and the second encounter; and presenting the second generated description of the element to the user.

17. The computer-implemented method of claim 16, wherein the visually perceptible changes are detected by a virtual world application, wherein the virtual world application is configured to individually detect each visually perceptible change to the element within the virtual environment selected from a presence of the element, a position of the element, a rate of movement of the element, a size of the element, a color of the element, a shape of the element, a state of the element, and a presence of peripheral or sub-elements of the element, wherein generating the second audio description of the element further comprises at least one of: (i) identifying a stored record related to the element as a new record, and (ii) identifying a change in a description of the element in a first stored record related to the element relative to a second stored record related to the element, wherein each record reflects the then-current state of the element and includes a timestamp indicating a time of the respective encounter, the method further comprising:

during a third encounter, by the avatar, with the element in the virtual environment:

generating a third audio description of the element, wherein the third description describes visually perceptible changes to the one or more characteristics described in the second description, and presenting the third generated description to the user.

18. The computer-implement method of claim 17, wherein the third audio description only describes visually perceptible changes programmatically determined to be significant;

wherein the significance of a visually perceptible change is determined based on:

(i) a magnitude of a change in appearance and a change in position of the change;

(ii) a frequency with which the avatar encounters the element; and (iii) an amount of time elapsed since a previous encounter.

19. The computer-implemented method of claim 18, wherein generating the second audio description of the element comprises:

upon determining that a time elapsed between the first encounter and the second encounter exceeds a threshold, generating the second audio description at a first level of detail; and upon determining that the time elapsed does not exceed the threshold, generating the second audio description at a second level of detail different from the first level of detail;

wherein the second audio description generated at the first level of detail includes: (i) each element of detail included in the second audio description generated at the second level of detail and (ii) at least one element of detail not included in the second audio description generated at the second level of detail.

* * * * *